Dec. 16, 1969  E. J. NITSCH ET AL  3,484,598
VEHICLE MARKER LIGHT
Filed Nov. 20, 1967  3 Sheets-Sheet 1
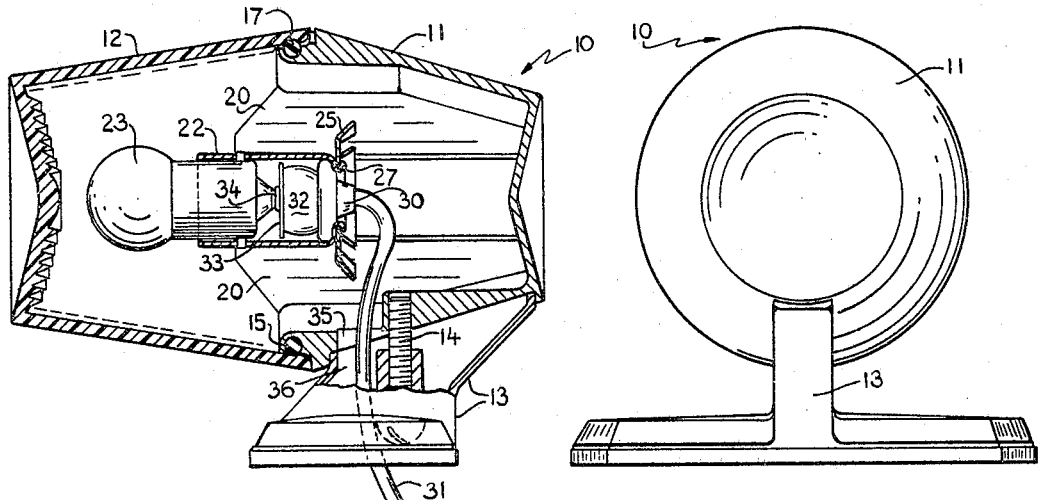
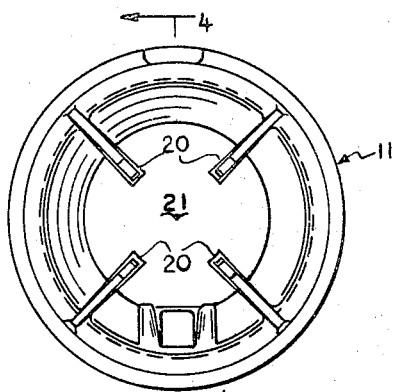
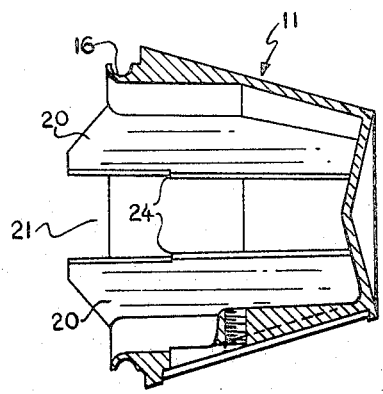
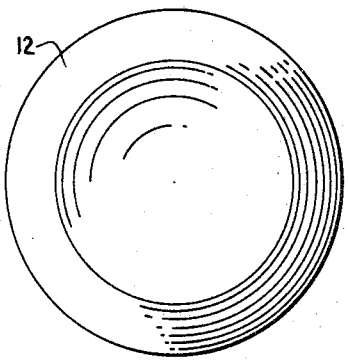
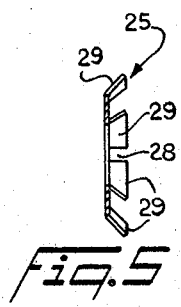
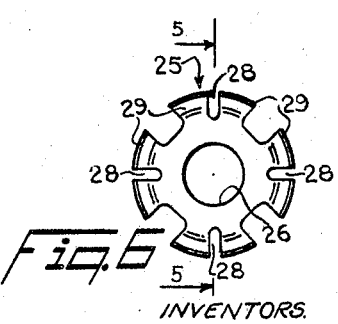
INVENTORS.
EDWARD J. NITSCH
JOHN F. STAHL
BY Bruns and Jenney
att'ys.

Dec. 16, 1969     E. J. NITSCH ET AL     3,484,598

VEHICLE MARKER LIGHT

Filed Nov. 20, 1967     3 Sheets-Sheet 2

INVENTORS.
EDWARD J. NITSCH
JOHN F. STAHL

BY Bruns and Jenney
          Att'ys.

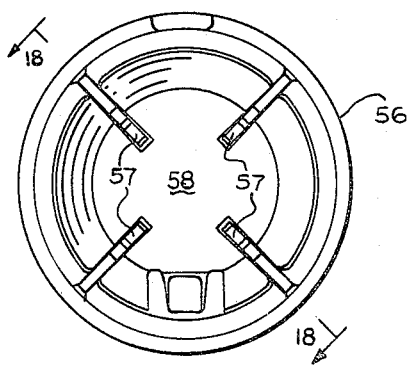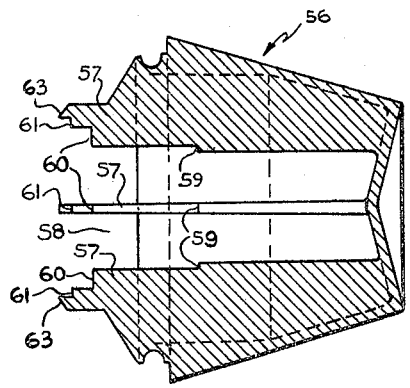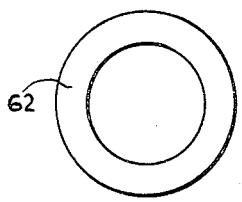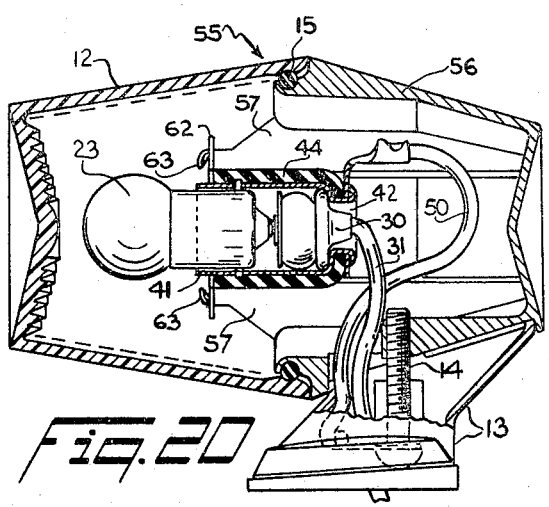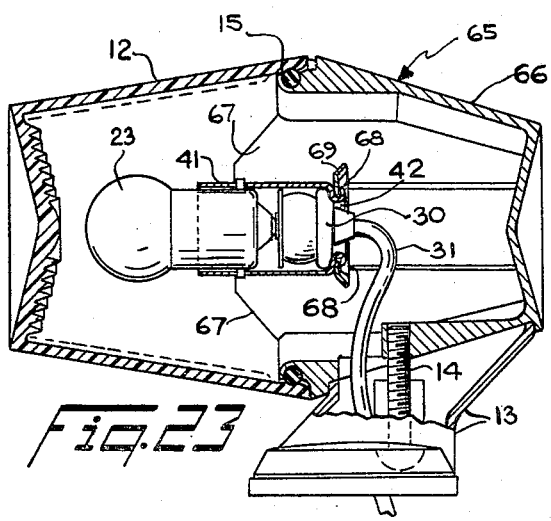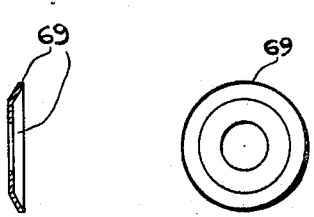

United States Patent Office 3,484,598
Patented Dec. 16, 1969

---

3,484,598
VEHICLE MARKER LIGHT
Edward J. Nitsch, Camillus, and John F. Stahl, Bridgeport, N.Y., assignors to R. E. Dietz Company, Syracuse, N.Y., a corporation of New York
Continuation-in-part of application Ser. No. 660,704, Aug. 15, 1967. This application Nov. 20, 1967, Ser. No. 706,206
Int. Cl. B60q 1/30
U.S. Cl. 240—7.1                                    11 Claims

ABSTRACT OF THE DISCLOSURE

A vehicle marker light arrangement in which a lamp socket is secured coaxially within a hollow light body having an open end to which the lens is secured. The body has inwardly projecting axially extending fins and, at its center, the tubular socket is secured to an annular member, the fins and annular member having cooperating means for securing the socket spaced from the fins and the fins having shoulders for positioning the socket axially of the light.

---

CROSS-REFERENCE TO RELATED APPLICATIONS

This application is a continuation in-part of application Ser. No. 660,704, filed Aug. 15, 1967, by the same applicants.

BACKGROUND OF THE INVENTION

This invention relates to vehicle marker lights an more particularly for an arrangement for securing the lamp bulb socket in the light body.

Heretofore the lamp socket has been secured to the light body by fastening means such as screws, rivets, or by welding or brazing which have to be manually secured or accomplished. Where independent socket support members have been used it has been difficult to properly and securely ground the ground contact portion of the socket to the body or other grounded portion of the light.

SUMMARY OF THE INVENTION

The present invention contemplates the use of an annular socket support member secured by a simple press operation to the socket. The light body is provided with inwardly projecting fins having shoulders for locating the axial position of the annular member, the member being secured in position by another simple press operation.

Accordingly, the principal object of the invention is to provide means by which the socket may be mounted in the body quickly, accurately, and simply.

A further important object is to provide means for a shock-proof mounting for the lamp socket which can be simply and easily secured to the light body.

Other objects and advantages will appear from the following description in conjunction with the appended drawings, in which:

BRIEF DESCRIPTION OF THE DRAWINGS

FIGURE 1 is a side elevational view, partly in section, of a marker light embodying the invention;
FIGURE 2 is a right hand end view thereof;
FIGURE 3 is a left hand end view of the body portion thereof;
FIGURE 4 is a sectional view on the line 4—4 of FIGURE 3;
FIGURE 5 is a sectional view on the line 5—5 of FIGURE 6;
FIGURE 6 is a plan view of the socket support member of the light of FIGURE 1;
FIGURE 7 is a left end elevation of the lens portion;
FIGURE 17 is an end elevational view of the body portion of a modified form of light;
FIGURE 18 is a sectional view on the line 18—18 of FIGURE 17;
FIGURE 19 is a plan view of the securing washer shown in FIGURE 20;
FIGURE 20 is a side elevational view, partly in section, of another modified form of marker light including the body portion of FIGURE 17;
FIGURES 21 and 22 are transverse sectional and plan views, respectively, of the socket support member shown in FIGURE 23;
and
FIGURE 23 is still another modified form of marker light.

DESCRIPTION OF THE PREFERRED EMBODIMENTS

Figure 8:
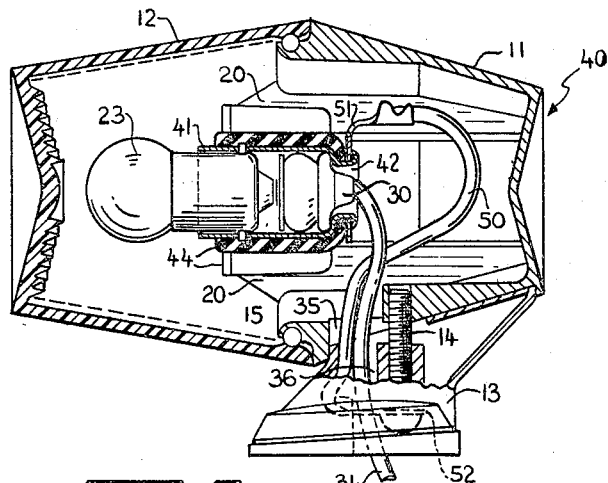
FIGURE 8 is a view similar to FIGURE 1 of a modified form of marker light.
Figure 14:
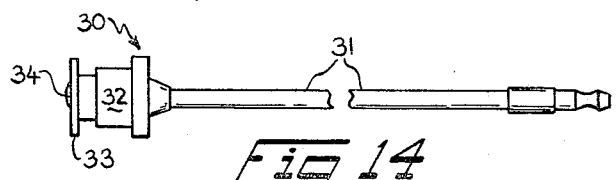
FIGURES 14 and 15 are fragmentary elevational views of the positive and negative lead wires, respectively, to the socket.
Figure 15:
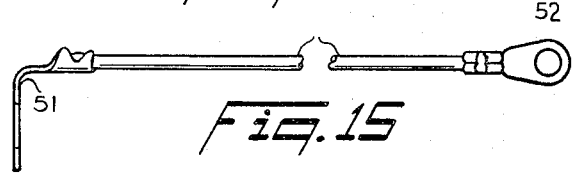

The marker light 10 of FIGURE 1 comprises a rounded open-end body 11 of metal, a plastic lens 12, and a die cast base 13 secured to the body by a screw 14. An O ring 15 is employed to removably secure lens to body in conventional manner, the body 11 being provided with a deep exterior groove 16 (FIGURE 4) and the lense 12 having a shallower internal groove 17 (FIGURE 1) at their engaged open ends.

The body 11 has a plurality of fins 20, here four, projecting inwardly, as best seen in FIGURE 3, toward a central space 21 adapted to receive the lamp socket 22. The fins 20 extend axially so that socket 22 may be secured axially of body 11 and they extend forward of the open end of body 11, as best seen in FIGURE 4, for supporting the bulb or lamp 23 within the cupped lens 12. Socket 22 is bayonet-slotted and the lamp 23 has conventional bayonet lugs engageable in the slots.

As best seen in FIGURE 4, each fin 20 has an outwardly facing shoulder 24 for locating the annular metal socket support member 25, the shoulders 24 all being in a common plane normal to the axis of body 11. The support member, shown in FIGURES 5 and 6, has a central opening or hole 26 into which the reduced neck 27 of socket 22 fits. The open end of neck 27 is then swaged over by pressing, or otherwise, so that socket 22 is secured to support member 25.

Around the periphery of member 25, four slots 28 extend radially inward. The peripheral portion of member 25 is bent rearward of the light body, as best seen in FIGURES 1 and 5 and the sides of slots 28 may be formed by tongues 29, as shown. When the member 25 with socket 22 attached is pressed inward in body 11 with fins 20 engaged in slots 28, the rearward slope of the edge of member 25 formed by tongues 29 gives a spring to the tongues so that slots 28 may be sprung slightly open to obtain a firm final engagement with the fins.

Socket 22 is provided with a conventional center contact assembly 30, including a lead wire 31, a resilient rubber spring portion 32 and a centering insulating desk 33 for the central contact 34. Body 11 is provided with a hole 35 leading to a hole 36 in base 13 so that lead wire 31 may be concealed in base 13 as it is led through a suitable hole in the vehicle for connection in the electrical system of the vehicle.

Base 13 is provided with holes, not here shown, for bolting the light to the vehicle and a pad or gasket may be provided between base 13 and the vehicle. Base 13 is thus grounded through its attachment bolts to the vehicle and body 11 is grounded to the base. The annular support member 25, being of metal electrically connects the socket 22, and hence the tubular base contact of lamp 23, to the grounded body 11.

In FIGURES 8–13, another light 40 is shown embodying the invention in an arrangement providing a shock-proof support for the lamp socket.

In the light 40, the same body 11, lens 12 and base 13 are employed as in light 10. Body 11 has the fins 20 projecting inward toward the space 21. A bayonet-slotted tucbular socket 41, like the socket 22, has a slightly longer reduced neck 42 and receives the bulb or lamp 23.

An annular rubber socket support member 44 supports socket 41 in the central space 21 of the body. Member 44, shown in FIGURES 9, 10, and 11, has a central opening 45, reduced at 46 to fit over the socket neck 42, to receive the socket 41. Inwardly projecting and axially extending slots 47 are provided in the periphery of the radially outward projecting ribs 48 of the member 44 into which the fins 20 are received to frictionally secure the member 44 in the space 21.

Since the socket 41 is otherwise electrically insulated by member 44, a ground lead wire 50 is provided with a washer-like end terminal 51 at one end. After member 44 is slipped over the socket 41 with the reduced end 46 around neck 42, the terminal 51 is slid over neck 42 and the end of the neck swaged over, as shown in FIGURE 8, to secure socket 41 in member 44. The other end of wire 50 is provided with a terminal 52 adapted to be grounded by the screw 14 which secures base 13 to body 11.

Socket 41 is provided with a lead wire and center socket assembly 30, like the light 10, for the center contact of lamp 23 and the wire 31 extends through neck 42 and through the holes 35 and 36 in body and base.

Figure 16:
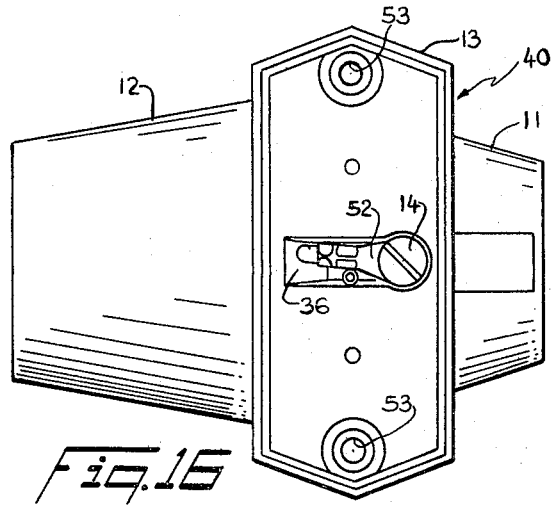
FIGURE 16 is a bottom plan view of the light of FIGURE 8.
Figure 9:
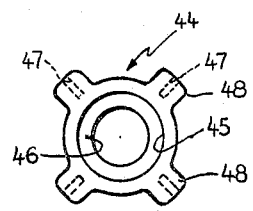
FIGURE 9 is an end view and FIGURE 10 is a side elevational view of the socket support member of FIGURE 8.
Figure 10:
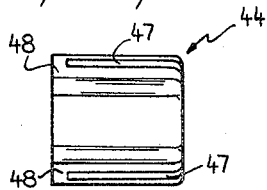
Figure 11:
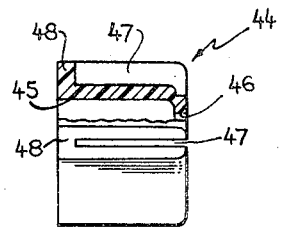
FIGURE 11 is a view similar to FIGURE 10 with the member rotated forty-five degrees and partly in section.
Figure 12:
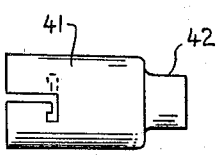
FIGURE 12 is a side elevational view and FIGURE 13 is a left end view of the socket.
Figure 13:
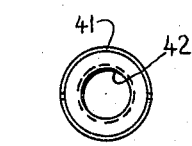

Holes 53 are shown in FIGURE 16 in base 13 through which the body and base may be grounded and secured to the vehicle by suitable bolts or screws.

While the light 40 is provided with a shock-proof mounting for socket 41, both light 40 and light 10 are provided with similar annular means for mounting the lamp socket axially of the light which may be assembled by a simple press operation and do not require other fasteners or welding of the socket in place.

In FIGURE 20 another light 55 is shown in which positive lock means are provided for securing the shock-proof socket mounting member 44 in place.

The body 56, shown in FIGURES 17 and 18, of the light 55 is like the body 11 of lights 10 and 40 except that the four fins 57 which project radially inward toward the central axially extending space 58 project outwardly of the body farther than fins 20 and are shouldered, as described hereinafter, at their outward ends. Body 56 is provided with the same base 13 and is engaged with lens 12 by the same O ring means 15.

The fins 57 may be provided shoulders 59 located similarly to the shoulders 24 of body 11, or these shoulders may be omitted. The resilient annular socket mounting member or sleeve 44 is mounted between the fins 59, the fins lying in the axially extending slots 47 in the ribs 48 of the mounting member, the member being positioned by the closed ends of the slots engaging the shoulders 60 formed adjacent the ends of fins 57 and best seen in FIGURE 18.

The tubular socket 41 is mounted in the member 44 and secured thereto by the swaged over end of its neck portion. A center contact 40 with its lead wire 31 is provided and the ground lead wire 50 grounds socket 41 to the screw 14.

For securing the sleeve 44 in position, however, each fin 57 is provided with a second outwardly facing shoulder 61 spaced from the shoulder 60 as best seen in FIGURE 18. Each of the shoulders 61 lies in a common plane normal to the axis of body 56.

A washer 62, shown in FIGURE 19, is placed in engagement with shoulders 61 over the outward ends of the ribs 48 of the sleeve 44 and the ends 63 of the fins 57 are bent over the perimeter of washer 62 to secure the washer in place.

The washer 62 forms positive means for locking socket 41 and its mount, sleeve 44, in place thus allowing formation of the slots 47 and fins 57 to be interengaged sufficiently loosely to increase the flexibility of the socket mounting.

Still another modified light 65 is shown in FIGURE 23. The body 66 has inwardly projecting fins 67 like the fins 20 of body 11 described hereinabove and outwardly facing coplanar shoulders 68 provide a seat for the annular light socket supporting member 69.

Member 69 is of steel and is dished like member 25 of the light 10 but has no outwardly projecting tongues 29, like those of member 25, nor slots 28 until it is assembled. The bulb socket 41 has the conventional center contact assembly 30 assembled therein and is secured by its neck 42 to the member 69 as described in connection with the light 10.

When the socket 41 and its mounting member 69 are assembled with body 66 the member 69 is pressed against shoulders 68 of the fins by a suitable powered press so that the bent over perimeter of member 69 digs into and indents itself into the axially extending portions of the fins adjacent their shoulder to lock the member in position. The perimeter of the member 69 is, at the same time, indented or slotted by the fins so as to be securely oriented with respect to body 66.

It will be apparent to one skilled in the art that, by providing the press with a carefully adjusted stop, the pressing operation can be controlled so that the socket 41 is located in the body 66 to bring the filament of the later assembled bulb 23 precisely at the focal point of the later attached lens 12.

As will be apparent to those familiar with the art, the invention may be embodied in other specific forms without departing from the spirit or essential characteristics thereof. The embodiments disclosed therefore are to be considered in all respects as illustrative, rather than restrictive, the scope of the invention being indicated by the appended claims.

What is claimed is:

1. A vehicle marker light having a hollow body which has one end open, the body being adapted to be grounded and secured to a vehicle; a lens having a focal point and removably secured to the open end of the body; the body having a plurality of angularly spaced and axially extending fins projecting inward toward a central space extending axially of the body; a tubular lamp socket of electrically conductive material having a reduced neck portion at one end secured coaxially in said space and spaced from the fins; an annular socket support member secured around at least the neck portion of the socket, the support member having radially inward extending depressions in its periphery in which the fins are engaged for orienting the member and socket with respect to the body; the fins having outwardly facing shoulders for positioning the member and socket axially with respect to the lens focal point; and means associated with the fins and the member for securing the member in position.

2. A vehicle marker light having a rounded hollow body with one open end; a base secured to the body and adapted to be grounded and secured to a vehicle; a lens removably secured to the open end of the body; the body having more than two angularly spaced and axially extending fins projecting inward toward a central space extending axially of the body; a tubular lamp socket of electrically conductive material having a reduced neck portion at one end secured coaxially in said space and spaced from the fins; and an annular socket support member secured around at least the neck portion of the socket, the support member having radially inward extending slots in its periphery in which the body fins are frictionally engaged for securing the socket in the body.

3. The light defined in claim 2 characterized by the annular socket support member being of electrically conductive material for grounding the socket, and the socket having therein a resiliently biased center contact insulated from the socket and adapted to be connected in an electric circuit by an insulated lead wire extending through the socket neck.

4. The light defined in claim 2 characterized by the annular socket support member being of a rubbery electrically nonconductive material for suppressing vibration and shock to the socket; the socket having connected therewith a first lead wire adapted to be grounded, and the socket having therein a resiliently biased center contact insulated from the socket and adapted to be connected in an electric circuit by a second insulated lead wire extending through the socket neck.

5. A vehicle marker light having a rounded hollow body with one open end; a base secured to the body and adapted to be grounded and secured to a vehicle; a lens removably secured to the open end of the body; the body having more than two angularly spaced, axially extending fins projecting inward toward a central space extending axially of the body; a tubular lamp socket of electrically conductive material having a reduced neck portion at one end secured coaxially in said space and spaced from the fins; and an annular socket support member around the socket neck portion, the neck portion having a swaged over end securing the socket to the annular member, said member having inwardly extending slots in its periphery in which the body fins are frictionally engaged for securing the socket coaxially in the body.

6. A vehicle light having a rounded hollow body with one open end; a base secured to the body and adapted to be grounded and secured to a vehicle; a lens removably secured to the open end of the body; the body having more than two equi-angularly spaced axially extending fins projecting inward toward a central space extending axially of the body; a tubular lamp socket of electrically conductive material having a reduced neck portion at one end secured coaxially in said space and spaced from the fins; and an annular sleeve of rubbery material around the socket and its neck portion, the neck portion having a swaged over end securing the socket in the annular sleeve, the sleeve having inwardly extending slots in its periphery in which the body fins are frictionally engaged for securing the socket coaxially in the body.

7. A vehicle marker light having a hollow body with one open end and adapted to be grounded and secured to a vehicle; a lens removably secured to the open end of the body and having a focal point; the body having a plurality of angularly spaced and axially extending fins projecting inward toward a central space extending axially of the body; a tubular lamp socket of electrically conductive material having a reduced neck portion at its inner end secured coaxially in said space and spaced from the fins; an annular socket support member secured around at least the neck portion of the socket for spacing the socket from the fins; each fin having at least one forwardly facing shoulder, the shoulders lying in a common plane normal to the body axis; and support member retaining means associated with the member and the fins for securing the member within the body, the shoulders locating the socket in desired relation to the focal point of the lens.

8. The light defined in claim 7 characterized by the annular socket support member being dished and of electrically conductive material for grounding the socket, the dished member being forced against the fin shoulders for indenting its perimeter into the axially extending face of the fins thereby forming the means for retaining the member axially of the light, the periphery of the dished member being indented by the fins for orienting the member in the body; and the socket having therein a resiliently biased center contact insulated from the socket and adapted to be connected in an electric circuit by an insulated lead wire extending through the socket neck.

9. The light defined in claim 7 characterized by the annular socket support member being of a rubbery, electrically non-conductive material for suppressing vibration and shock to the socket; the socket having connected therewith a first lead wire adapted to be grounded; the socket having therein a resiliently biased center contact insulated from the socket and adapted to be connected in an electric circuit by a second insulated lead wire extending through the socket neck; and a washer abutting the fin shoulders for retaining the annular member between the fins, the outer ends of the fins being swaged over the perimeter of the washer for securing the washer against the shoulders.

10. A vehicle marker light having a rounded hollow body open at one end; a base secured to the body and adapted to be grounded and secured to a vehicle; a lens having a focal point and removably secured to the open end of the body; the body having more than two equi-angularly spaced, axially extending fins projecting inward toward a central space extending axially of the body; a tubular lamp socket of electrically conductive material having a reduced neck portion at its inner end secured coaxially in said space and spaced from the fins; and an annular, dished, metal, socket support member around the socket neck portion, the neck portion having a swaged over end securing the socket to the annular member; the fins each having an outwardly facing shoulder, the shoulders lying in a common plane normal to the body axis for locating the socket axially with respect to the lens focal point; the dished annular member being pressed against the fin shoulders for indenting the periphery of the member in the axially disposed edges of the fins for securing the member axially of the body.

11. A vehicle marker light having a rounded hollow body open at one end; a base secured to the body and adapted to be grounded and secured to a vehicle; a lens having a focal point and removably secured to the open end of the body; the body having more than two equi-angularly spaced, axially extending fins projecting inward toward a central space extending axially of the body; a tubular lamp socket of electrically conductive material having a reduced neck portion at one end secured coaxially in said space and spaced from the fins; an annular sleeve of rubbery material around the socket and its neck portion, the neck portion having a swaged over end securing the socket in the annular sleeve, the sleeve having inwardly extending slots in its periphery in which the body fins are engaged for orienting the socket in the body; each fin having an outwardly facing shoulder for fixing the sleeve axially in the body, the shoulders lying in a common plane normal to the body axis; and a washer engaged with the fin shoulders, the outward ends of the fins being swaged over to secure the washer against the fin shoulders.

References Cited
UNITED STATES PATENTS

| | | | |
|---|---|---|---|
| 1,514,959 | 11/1924 | Godley | 240—8.2 |
| 2,988,632 | 6/1961 | Curtis | 240—8.3 |
| 3,096,026 | 7/1963 | Bruce et al. | 240—7.1 |
| 3,115,307 | 12/1963 | Dickson | 240—8.3 |
| 3,208,031 | 9/1965 | Dickson | 240—8.3 XR |

NORTON ANSHER, Primary Examiner

R. P. GREINER, Assistant Examiner